United States Patent [19]

Felix et al.

[11] Patent Number: 5,248,433
[45] Date of Patent: Sep. 28, 1993

[54] BINARY AZEOTROPIC MIXTURES OF OCTAFLUOROPROPANE AND FLUOROETHANE

[75] Inventors: Vinci M. Felix, Kennett Square, Pa.; Mark B. Shiflett, Newark, Del.

[73] Assignee: E. I. Du Pont de Nemours and Company, Wilmington, Del.

[21] Appl. No.: 878,404

[22] Filed: Apr. 30, 1992

[51] Int. Cl.$^5$ .......................... C09K 5/04; C09K 3/30; A62D 1/08; C08J 9/14

[52] U.S. Cl. ........................................ 252/67; 60/651; 62/114; 174/17 GF; 174/25 G; 252/8; 252/172; 252/305; 252/364; 252/571; 252/DIG. 9; 264/53; 264/DIG. 5; 521/98; 521/131

[58] Field of Search ............... 252/67, 172, 305, 364, 252/DIG. 9, 8, 571; 62/114; 264/53, DIG. 5; 521/98, 131; 174/17 GF, 25 G; 60/651

[56] References Cited

U.S. PATENT DOCUMENTS

| | | | |
|---|---|---|---|
| 1,968,050 | 7/1934 | Miagley, Jr. et al. | 252/67 |
| 3,019,614 | 2/1962 | Schubert et al. | 252/67 |
| 3,173,872 | 3/1965 | Broadley et al. | 252/67 |
| 3,863,005 | 1/1975 | Male et al. | 424/45 |
| 4,129,530 | 12/1978 | Park et al. | 521/79 |
| 4,436,641 | 3/1984 | Stelz et al. | 252/68 |
| 4,945,119 | 7/1990 | Smits et al. | 521/131 |
| 5,066,410 | 11/1991 | Omure et al. | 252/68 |

FOREIGN PATENT DOCUMENTS

| | | | |
|---|---|---|---|
| 406206 | 2/1991 | European Pat. Off. | |
| 419042 | 3/1991 | European Pat. Off. | |
| 427604 | 5/1991 | European Pat. Off. | |
| 271121 | 8/1989 | Fed. Rep. of Germany | 252/67 |
| 1362739 | 12/1987 | U.S.S.R. | 252/67 |
| 92/01762 | 2/1992 | World Int. Prop. O. | 252/67 |

OTHER PUBLICATIONS

Research Disclosure vol. 146 disclosure No. 14623 "Hydrogen containing chlorofluoro carbons" pp. 13-14 Jun. 1976.

"CRC Handbook of Chemistry and Physics 63rd Ed 1983" p. C-288.

Primary Examiner—Linda Skaling
Attorney, Agent, or Firm—P. Michael Walker

[57] ABSTRACT

Constant boiling azeotropic or azeotrope-like mixtures of octafluoropropane and fluoroethane are useful as refrigerants, aerosol propellants, heat transfer media, gaseous dielectrics, fire extinguishing agents, expansion agents for polyolefins and polyurethanes and as power cycle working fluids.

7 Claims, No Drawings

BINARY AZEOTROPIC MIXTURES OF OCTAFLUOROPROPANE AND FLUOROETHANE

BACKGROUND OF THE INVENTION

This invention relates to mixtures of fluorinated hydrocarbons and more specifically to substantially constant boiling mixtures of octafluoropropane (FC-218) and fluoroethane (HFC-161).

Recently the long-term environmental effects of chlorofluorocarbons have come under scientific scrutiny, because it has been postulated that these materials because of their high stability are able to reach the stratosphere where under the influence of ultraviolet radiation release chlorine atoms which, in turn, undergo chemical reaction with stratospheric ozone. Reduction of stratospheric ozone would increase the amount of ultraviolet radiation reaching the earth's surface. In view of the potential environmental problems associated with stratospheric ozone depletion, there is a need for new materials possessing properties which make them useful substitutes for applications in which chlorofluorocarbons have been used and are environmentally safe.

There is a limit to the number of single fluorinated hydrocarbon substances which could be candidates as environmentally safe materials. Mixtures of known fluorinated hydrocarbons, however, might be used if the desired combination of properties could be found in a given mixture. Simple mixtures, however, create problems in design and operation of refrigeration and other equipment because of component segregation in both the vapor and liquid phases. To avoid component segregation problems, it is particularly desirable to discover new azeotropic or substantially constant boiling fluorocarbon blends. Such blends or compositions should not suffer from component segregation problems. Unfortunately, it is not possible to predict the formation of azeotropes or substantially constant boiling compositions, thus complicating the search for novel azeotropic compositions which possess the desired combination of properties.

There is a need for substantially constant boiling compositions which have properties which make them particularly useful as refrigerants, aerosol propellants, heat transfer media, gaseous dielectrics, fire extinguishing agents, expansion agents for polyolefins and polyurethanes and as power cycle working fluids and that are potentially environmentally safe.

SUMMARY OF THE INVENTION

The present invention is directed to substantially constant boiling compositions comprising 69-84 weight percent, preferably 75-79 weight percent octafluoropropane ($CF_3CF_2CF_3$, boiling point $-36.5°$ C.) and 16-31 weight percent, preferably 21-25 weight percent, fluoroethane ($CF_2FCH_3$, boiling point $-37.1°$ C.). Particularly preferred azeotropic compositions comprise about 77.4 weight percent octafluoropropane and about 22.6 weight percent fluoroethane boiling at 0° C. at 4953 torr.

The novel compositions of the present invention exhibit a higher vapor pressure than either of its two fluorocarbon constituents. Substantially constant boiling compositions as used in the present invention means that the vapor pressure at 25° C. does not change by more than 10% after half of the initial composition has been allowed to evaporate. Thus, the compositions described herein resist component segregation which would seriously diminish their usefulness in the contemplated applications. In addition, studies have further shown that the compositions of the present invention exhibit dew point pressures and bubble point pressures with small pressure differentials that do not exceed about 10 psia. It is known that such a small difference between the dew point pressure and the bubble point pressure indicates that the mixtures are substantially constant boiling and exhibit azeotrope-like behavior.

The substantially constant boiling compositions of the present invention are useful as refrigerants, heat transfer media, fire extinguishing agents, aerosol propellants, blowing agents.

DETAILED DESCRIPTION OF THE PREFERRED EMBODIMENTS

The fluorinated compounds which comprise these mixtures are identified in the industry as FC-218 (octafluoropropane) and HFC-161 (fluoroethane), respectively, in nomenclature conventional in the halocarbon field.

A phase study on various mixtures of octafluoropropane and fluoroethane containing widely different amounts of the fluorocarbons indicate that at constant temperature an azeotrope is formed over the vapor pressure range studied. Further studies for the evaluation of compositions of the present invention containing a wide range of proportions of the fluorocarbon components indicates that the compositions are resistant to component fractionation of the mixture and they are substantially constant boiling compositions. Utilizing the particular fluorocarbon components in the amounts described, quite unexpectedly, illustrate that at constant temperature of 25° C. the change in vapor pressure of the compositions even after 50% of the initial composition has been allowed to evaporate does not change by more than 10%. The small change in vapor pressure at constant temperature illustrates that the amount of separation and loss of one fluorocarbon component in excess amount that would substantially change the boiling temperature of the mixture does not occur, which makes the compositions suitable for the contemplated uses mentioned above, especially for use as a refrigerant.

In addition, studies have further indicated that the novel substantially constant boiling compositions of the present invention exhibit dew point pressures and bubble point pressures with only small pressure differentials. As is well known in the art, a small difference between dew and bubble point pressures is an indication of the constant boiling or azeotrope-like behavior of the compositions. The pressure differentials demonstrated by the substantially constant boiling compositions of the present invention are very small, usually less than about 5 psia, when compared with those of several known, nonazeotropic, binary compositions.

As is well recognized in this field of technology, there is a range of compositions which contain the same components as the true azeotrope, which not only will exhibit substantially equivalent properties as the true azeotrope for refrigerant and other applications, but which will also exhibit substantially equivalent properties to that of the true azeotropic composition in terms of constant boiling characteristics or tendency not to segregate or fractionate on boiling at other temperatures and pressures. Azeotropic or constant boiling means substantially azeotropic. Included within the meaning of the terms are not only the true azeotropic but also other compositions containing the same components in different proportions which are true azeotropes at other temperatures and pressures as well as those equivalent compositions which are part of the same azeotropic system and are azeotrope-like in their properties.

Compositions comprising 69–84 weight percent octafluoropropane, the balance fluoroethane, are substantially constant boiling at pressures of 190 psia±6 and 25° C. Compositions comprising 75–79 weight percent octafluoropropane, the balance fluoroethane, are substantially constant boiling at pressures of 194 psia±2 and 25° C.

Additives that are frequently incorporated in fluorocarbon compositions used for purposes mentioned above that can be added to compositions of the present invention include lubricants, corrosion inhibitors, stabilizers and dyes.

The fluorocarbon compositions described herein can be used to produce refrigeration by condensing the constant boiling compositions and thereafter evaporating the compositions, i.e., condensate, in the vicinity of a body to be cooled. Further, these fluorocarbon compositions described herein can also be used to produce heat by condensing the constant boiling compositions in the vicinity of a body to be heated and thereafter evaporating the compositions.

In addition to refrigeration and heating applications, the novel substantially constant boiling compositions of this invention are also useful as aerosol propellants, gaseous dielectrics, fire extinguishing agents, expansion agents for polyolefins and polyurethanes and as power cycle working fluids.

The use of substantially constant boiling compositions of this invention eliminates the problem of component fractionation and handling in system operations because the fluorocarbon compositions behave substantially as a single substance.

The fluorocarbon compositions of the present invention have zero ozone depletion potentials compared with Refrigerant 502, which has a 0.23 ozone depletion potential.

The following Examples further illustrate the invention wherein parts and percentages are by weight unless otherwise indicated.

EXAMPLE 1

A phase study was made on mixtures of octafluoropropane (FC-218) and fluoroethane (HFC-161) wherein the composition was varied and the vapor pressures measured at a constant temperature of 0° C. An azeotropic composition was obtained, as evidenced by the maximum vapor pressure observed, and was identified as follows:

TABLE 1

| Octafluoropropane (FC-218) | = 77.4 weight percent |
|---|---|
| Fluoroethane (HFC-161) | = 22.6 weight percent |
| Vapor pressure | = 4953 torr at 0° C. |

EXAMPLE 2

A phase study was made on octafluoropropane (FC-218) and fluoroethane (HFC-161) to verify minimal fractionation and change in vapor pressure and composition during a vapor loss at 25° C. Initial liquid (IQ), final liquid (FQ), vapor composition (1–5), vapor pressure, and change in vapor pressure from the initial vapor pressure were all studied. Two mixtures given in the Tables 2 and 3 below were studied to determine the effects of vapor leakage.

TABLE 2

| Sample | Percent Loss of Mixture | Composition (wt. %) FC-218 | Composition (wt. %) HFC-161 | Vapor Pressure psia | Vapor Pressure Change (%) |
|---|---|---|---|---|---|
| IQ | 0 | 85.0 | 15.0 | 193.8 | 0 |
| 1 | 0 | 79.4 | 20.6 | 193.8 | 0 |
| 2 | 10 | 79.6 | 20.4 | 193.5 | 0.2 |
| 3 | 20 | 79.9 | 20.1 | 193.2 | 0.3 |
| 4 | 30 | 80.2 | 19.8 | 192.7 | 0.6 |
| 5 | 40 | 80.7 | 19.3 | 192.0 | 0.9 |
| 6 | 50 | 81.3 | 18.7 | 190.9 | 1.5 |
| FQ | 50 | 89.1 | 10.9 | 190.9 | 1.5 |

The compositions are substantially constant-boiling with only a 1.5% change in vapor pressure at 25° C. when 50% of the original mixture is evaporated.

TABLE 3

| Sample | Percent Loss of Mixture | Composition (wt. %) FC-218 | Composition (wt. %) HFC-161 | Vapor Pressure psia | Vapor Pressure Change (%) |
|---|---|---|---|---|---|
| IQ | 0 | 70.0 | 30.0 | 194.5 | 0 |
| 1 | 0 | 75.6 | 24.4 | 194.5 | 0 |
| 2 | 10 | 75.5 | 24.5 | 194.4 | 0.1 |
| 3 | 20 | 75.3 | 24.7 | 194.3 | 0.1 |
| 4 | 30 | 75.1 | 24.9 | 194.1 | 0.2 |
| 5 | 40 | 74.8 | 25.2 | 193.8 | 0.4 |
| 6 | 50 | 74.4 | 25.6 | 193.4 | 0.6 |
| FQ | 50 | 63.8 | 36.2 | 193.4 | 0.6 |

The compositions are substantially constant boiling with only a 0.6% change in vapor pressure at 25° C. when 50% of the original mixture is evaporated.

EXAMPLE 3

Evaluation of the refrigeration properties of the azeotropic mixtures of the invention versus Refrigerant-502 and pentafluoroethane (HFC-125), respectively, are shown in the following Table.

TABLE 4

| | Comparison of Refrigeration Performances | | | | |
|---|---|---|---|---|---|
| | | | Weight Percentages | | |
| | | | (70 + 30) | (77.4 + 22.6) | (85 + 15) |
| | Refrigerants | | Octafluoropropane and Fluuoroethane | | |
| | R-502 | HFC-125 | Mixture | Azeotrope | Mixture |
| Evaporator Temp, °F. | −30.0 | −30.0 | −30.0 | −30.0 | −30.0 |
| Evaporator Press, psia | 24.0 | 26.9 | 27.0 | 27.9 | 25.4 |
| Condenser Temp, °F. | 110.0 | 110.0 | 110.0 | 110.0 | 110.0 |
| Condenser Press, psia | 269.3 | 308.6 | 298.0 | 297.7 | 290.0 |
| Return Gas Temp, °F. | 65.0 | 65.0 | 65.0 | 65.0 | 65.0 |
| Return Gas Temp, °F. | 65.0 | 65.0 | 65.0 | 65.0 | 65.0 |
| Compressor Discharge, °F. | 234 | 215 | 212 | 201 | 194 |
| Coefficient of Performance | 2.0 | 1.8 | 1.8 | 1.8 | 1.7 |
| Capacity | 80.8 | 94.5 | 81.0 | 81.5 | 72.0 |

TABLE 4-continued

Comparison of Refrigeration Performances

| | Refrigerants | | Weight Percentages | |
|---|---|---|---|---|
| | | (70 + 30) | (77.4 + 22.6) | (85 + 15) |
| | | Octafluoropropane and Fluuoroethane | | |
| | R-502 HFC-125 | Mixture | Azeotrope | Mixture |
| Btu/min | | | | |

Capacity is intended to means the change in enthalpy of the refrigerant in the evaporator per pound of refrigerant circulated, i.e., the heat removed by the refrigerant in the evaporator per time.

Coefficient of performance (COP) is intended to means the ratio of the capacity to the compressor work. It is a measure of refrigerant energy efficiency.

For a refrigeration cycle typified by the above conditions, the COP increases by adding fluoroethane to octafluoropropane. The azeotrope composition has essentially the same performance as R-502 with respect to capacity. The azeotrope composition has the same energy efficiency as HFC-125. Therefore, mixtures of octafluoropropane and fluoroethane offer essentially the same capacity as R-502 with the same energy efficiency as HFC-125.

EXAMPLE 4

The following fluorocarbon compositions of the present invention are shown to exhibit small differences in dew point pressure and bubble point pressure.

TABLE 5

| Refrigerant Composition (wt. %) | Pressures at 25° C. | | |
|---|---|---|---|
| | Dew Point Pressure (psia) | Bubble Point Pressure (psia) | Difference in Pressure (psia) |
| FC-218 + HFC-161 (69 + 31) | 194.4 | 184.6 | 9.8 |
| FC-218 + HFC-161 (70 + 30) | 194.6 | 186.4 | 8.2 |
| FC-218 + HFC-161 (80 + 20) | 195.0 | 193.1 | 1.9 |
| FC-218 + HFC-161 (84 + 16) | 194.2 | 184.7 | 9.4 |
| HFC-125 + HFC-134a | 147.5 | 129.7 | 17.8 |

TABLE 5-continued

| Refrigerant Composition (wt. %) | Pressures at 25° C. | | |
|---|---|---|---|
| | Dew Point Pressure (psia) | Bubble Point Pressure (psia) | Difference in Pressure (psia) |
| (50 + 50) HFC-22 + HFC-142a (50 + 50) | 97.5 | 73.4 | 24.1 |

The novel azeotrope, or azeotrope-like, compositions of the instant invention exhibit small differences in dew point and bubble point pressures. As is well known in the art, the difference between dew point and bubble point pressures is an indication of the azeotrope-like behavior of mixtures. The pressure differentials demonstrated by the azeotrope-like mixtures of the instant invention are small when compared with those of several known, nonazeotropic, binary compositions, namely, (50+50) weight percent mixtures of pentafluoroethane (HFC-125) and 1,1,1,2-tetrafluoroethane (HFC-134a) and chlorodifluoromethane (HCFC-22) and 1-chloro-1,1-difluoroethane (HCFC-142b), respectively.

We claim:

1. A substantially constant boiling composition consisting essentially of 69–84 weight percent octafluoropropane and 16–31 weight percent fluoroethane which has a vapor pressure of 190±6 psia at 25° C.

2. A substantially constant boiling composition of claim 1 consisting essentially of 75–79 weight percent octafluoropropane and 21–25 weight percent fluoroethane which has a vapor pressure of 194±2 at 25° C.

3. A substantially constant boiling composition of claim 1 having a vapor pressure of 4953 torr at 0° C.

4. A process for producing refrigeration which comprises condensing the composition of claim 1 and thereafter evaporating said composition in the vicinity of a body to be cooled.

5. A process for producing heat which comprises condensing the composition of claim 1 in the vicinity of a body to be heated and thereafter evaporating said composition.

6. A process for producing refrigeration which comprises condensing the composition of claim 2 and thereafter evaporating said composition in the vicinity of a body to be cooled.

7. A process for producing heat which comprises condensing the composition of claim 2 in the vicinity of a body to be heated and thereafter evaporating said composition.

* * * * *